United States Patent [19]

Bestel et al.

[11] Patent Number: 5,736,705
[45] Date of Patent: Apr. 7, 1998

[54] GRADING RING INSERT ASSEMBLY

[75] Inventors: E. Fred Bestel, West Allis; Paul Newcomb Stoving, South Milwaukee, both of Wis.

[73] Assignee: Cooper Industries, Inc., Houston, Tex.

[21] Appl. No.: 713,865

[22] Filed: Sep. 13, 1996

[51] Int. Cl.[6] ........................................ H01H 33/00
[52] U.S. Cl. ........................................ 218/155; 200/293
[58] Field of Search .................... 174/5 R, 55 B, 174/556, 50, 54, 51, 52.1, 52.2, 140 R, 141 R, 142, 144, 148, 158 R, 161 R, 165, 166 R, 166 S; 200/293, 294, 302.1; 218/1, 10, 11, 22, 41–43, 46, 56, 68, 89, 97, 103, 118–121, 134–140, 155; 361/2, 42, 600, 692, 658, 673, 837

[56] References Cited

U.S. PATENT DOCUMENTS

| | | | |
|---|---|---|---|
| 3,159,731 | 12/1964 | Leuhring | 200/144 |
| 3,189,715 | 6/1965 | Jennings | 200/144 |
| 3,275,775 | 9/1966 | Hawkins | 200/144 |
| 3,471,669 | 10/1969 | Curtis | 200/144 B |
| 3,626,123 | 12/1971 | Pflanz | 200/144 B |
| 3,955,167 | 5/1976 | Kumbera | 337/188 |
| 3,959,577 | 5/1976 | Frink | 174/50.5 |
| 4,007,345 | 2/1977 | Kohler et al. | 200/144 R |
| 4,150,270 | 4/1979 | Zunick | 200/144 B |
| 4,168,414 | 9/1979 | Kumbera et al. | 200/153 G |
| 4,568,804 | 2/1986 | Luehring | 200/144 B |
| 5,286,932 | 2/1994 | Rouch et al. | 200/144 B |
| 5,585,611 | 12/1996 | Harvey et al. | 218/155 |
| 5,597,992 | 1/1997 | Walker | 218/121 |

*Primary Examiner*—Michael L. Gellner
*Assistant Examiner*—Michael A. Friedhofer
*Attorney, Agent, or Firm*—Burns, Doane, Swecker & Mathis LLP

[57] ABSTRACT

An encapsulation for an interrupter includes a main body that includes an internal cavity, the internal cavity including a space at a first end thereof for the interrupter, a second end of the main body including a surface for mounting the encapsulation, an insert assembly mounted in the second end for facilitating mounting the encapsulation, the insert assembly including a rigid connector and a plurality of fasteners fixed to the rigid connector.

15 Claims, 8 Drawing Sheets

Electric Field (stress), inserts at ground, bottle at 150 kV

GRADING RING INSERT ASSEMBLY

BACKGROUND OF THE INVENTION

1. Field of the Invention

The present invention relates to an encapsulation for a high voltage interrupter.

2. Description of Related Art

High voltage interrupters are typically mounted at the upper end of an epoxy or porcelain structure or encapsulation that includes an internal chamber for supporting the interrupter and operating rod.

The structure must be designed to prevent "tracking," i.e., charges from creeping along the surface of the wall of the structure from high potential to a frame which is at ground potential as a result of surface contamination condensing and building up on the surface. In addition, the structure must be designed to prevent a direct strike of charges between the interrupter and the base. As a general rule, the length of the surface necessary to prevent creep is longer than that needed to prevent a strike. Accordingly, the support structures are typically taller than necessary.

In addition, the base of an epoxy encapsulation is bolted to a frame or structure at the bottom end of the support. Typically threaded nuts are inserted into a mold prior to casting the epoxy encapsulation. The finished cast product then includes a plurality of nuts that can be used to bolt the encapsulation to a frame. However, on occasion, one or more nuts are omitted or put in at an incorrect angle, thus jeopardizing the final product strength in addition, on occasion, uneven loading may cause the insert nuts to pull out, thus also weakening the strength of the structure.

OBJECTS AND SUMMARY

It is an object of the present invention to overcome the above-described disadvantages of the prior art by utilizing a design wherein tracking can be avoided without having to create a structure that is taller than necessary to overcome strikes.

It is a further object to provide a design that is simpler to construct than those of the prior art and provides increased strength.

An encapsulation for an interrupter includes a main body that includes an internal cavity, the internal cavity including a space at a first end thereof for the interrupter, a second end of the main body including a surface for mounting the encapsulation, an insert assembly mounted in the second end for facilitating mounting the encapsulation, the insert assembly including a rigid connector and a plurality of fasteners fixed to the rigid connector.

DETAILED DESCRIPTION OF THE PREFERRED EMBODIMENTS

Figure 1:
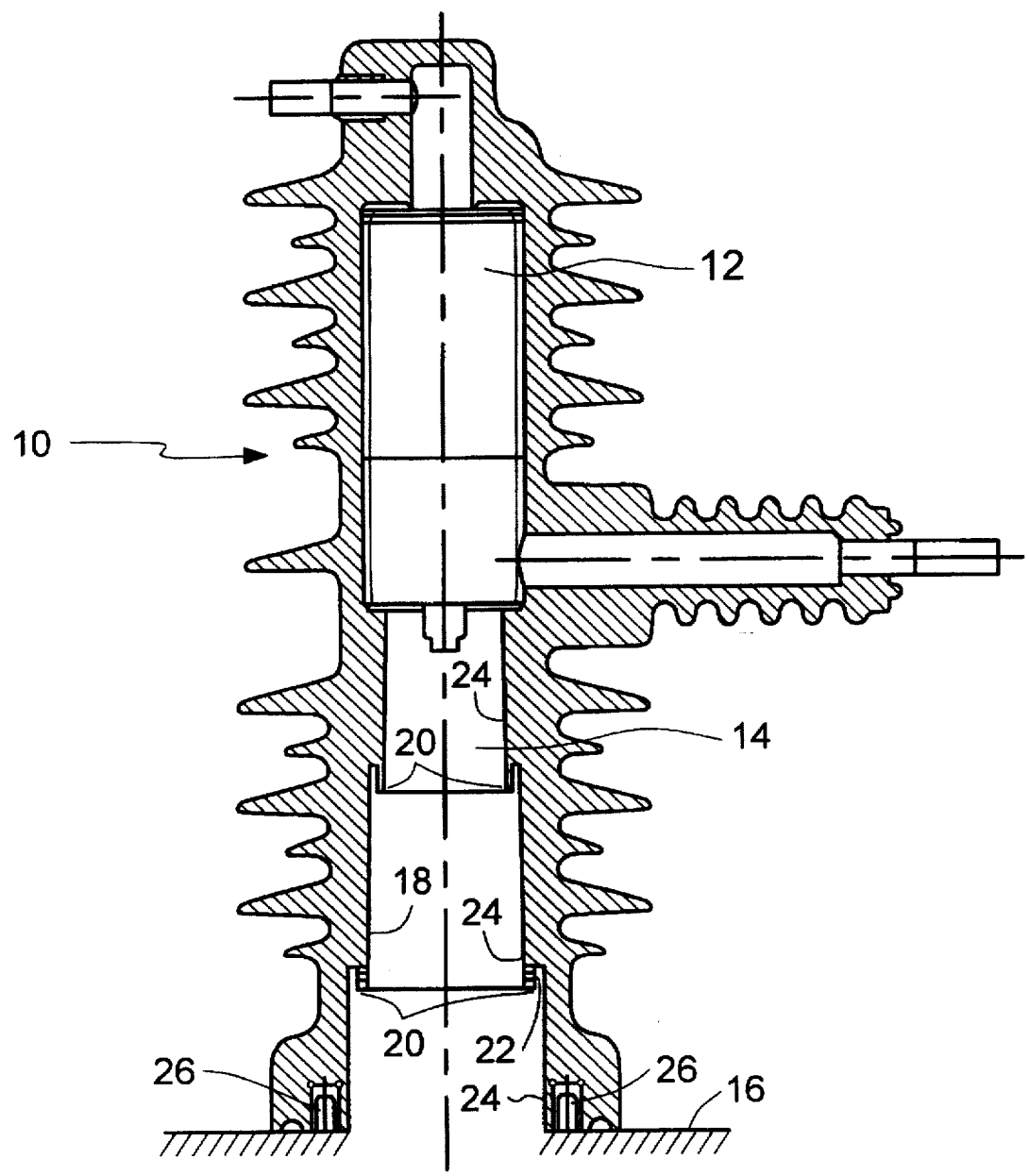
FIG. 1 is a view of an interrupter encapsulation according to the present invention.

Turning attention to FIG. 1, an encapsulation or support 10 for an interrupter 12 is illustrated. The encapsulation 10 includes an internal chamber 14, through which an operating rod (not shown) passes for connecting the interrupter 12 to an activating mechanism (not shown) in the frame 16 below the encapsulation 10.

The encapsulation 10 may be cast from epoxy, or any other suitable material capable of withstanding the stresses that occur during activation of the interrupter 12. In a preferred embodiment, cycloaliphatic prefilled hot-curing two-component epoxy resin is used to form the encapsulation.

If the distance between the interrupter 12 and the frame 16 is insufficient, a phenomenon known as striking may occur, in which a charge jumps from the interrupter 12 to the frame 16. Accordingly, the distance between the interrupter 12 and the frame 16 must be kept greater than a predetermined distance, i.e., the strike distance, depending upon the conditions and voltages at which the interrupter 12 is being used.

In addition, a charge may creep along the internal wall 18 or surface of the internal chamber 14. Accordingly, the length of the wall 18 should be kept greater than a certain distance to prevent creep. Typically the distance necessary to prevent creep is greater than the strike distance. Accordingly, in order to prevent creep, the prior art structures were designed taller than was necessary to prevent strikes.

According to the present invention, convolutions 20 are designed into the internal wall 18 in order to increase the overall length of the internal wall 18 so as to decrease the likelihood of creep. As a result of the increased length of the wall added by the convolutions 20, creep can be avoided without having to make the encapsulation 10 taller than is necessary to avoid strikes.

The convolutions 20 can be as wide and deep as molding and mechanical constraints allow. In a preferred embodiment, each convolution 20 is about one-half inch deep, adding about one inch of creep distance per convolution 20.

The convolutions 20 can be cast by inserting a ram or core into the internal chamber 14 during the casting process. By designing the walls 22 of the convolutions 20 substantially parallel to the internal wall 18 of the internal chamber 14, the ram can be easily inserted and withdrawn.

An additional benefit of the design of the internal chamber 14 is that, as a result of the convolutions 20, the internal wall is formed by a plurality of overlapping skirt-like sections 24. Thus, if moisture is trapped inside the internal chamber 14 should condense, resulting in water flowing down the wall 18, the water will drop from each of the convolutions 20, thus preventing a continuous stream of water that would contribute to tracking. In a sense, each of the skirts 24 acts as an umbrella to prevent the underlying skirts 24 from becoming wet.

In a preferred embodiment, the wall 18 of the chamber 14 includes two convolutions 20. Other quantities of convolutions 20 may be used depending on the particular application of the interrupter 12.

Figure 9:
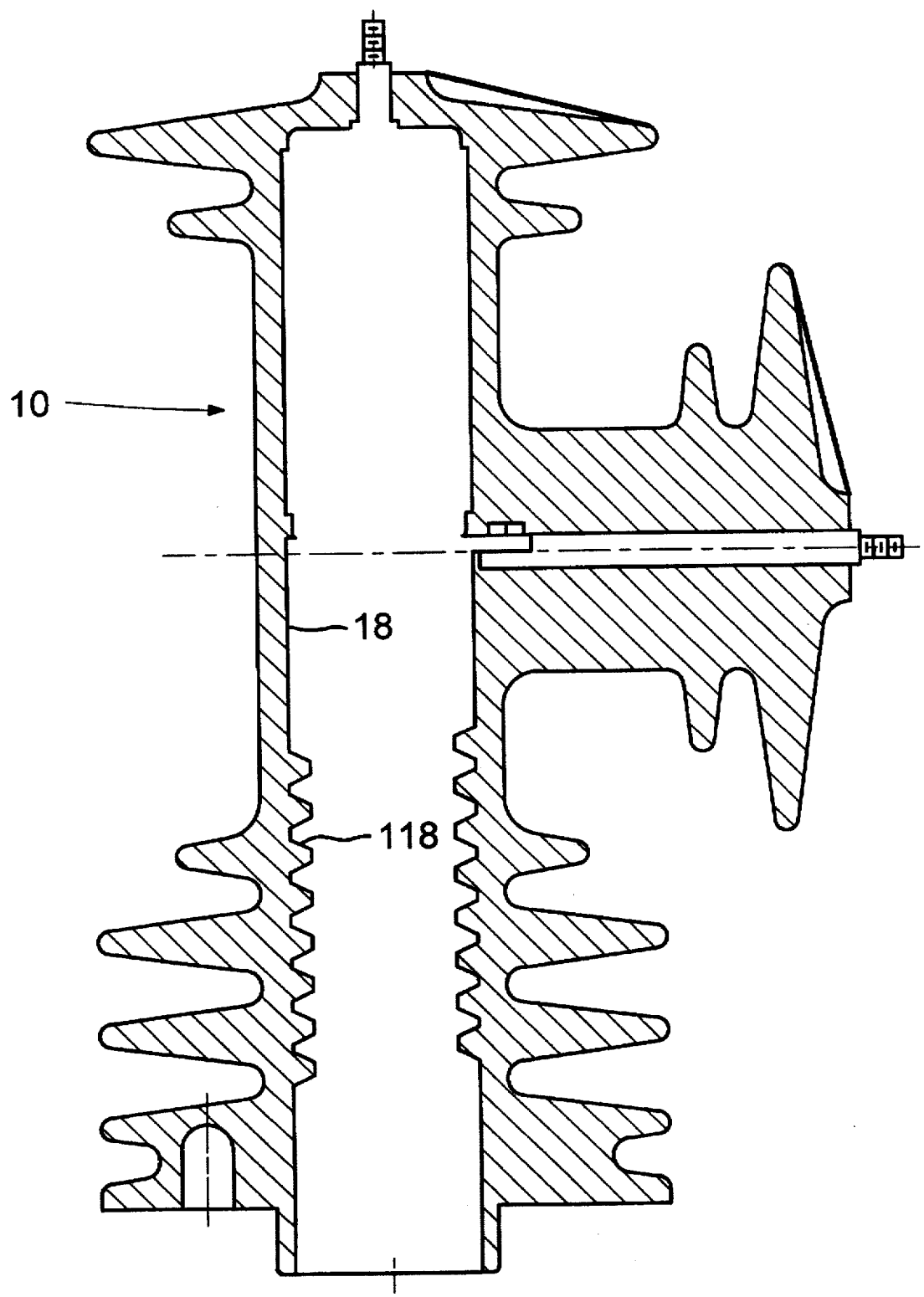
FIG. 9 illustrates a cross-section of an alternative embodiment of the present invention.

Alternatively, the increase of the overall wall length may be achieved during casting by the use of a threaded ram which may be withdrawn from the mold cavity subsequent to casting by rotating the ram to unscrew it from the casting. The thread 118 cast into the inner wall 18 may extend for more than 360° and may be one-half inch deep. FIG. 9 is a cross section of an encapsulation formed with a threaded ram.

Figure 2:
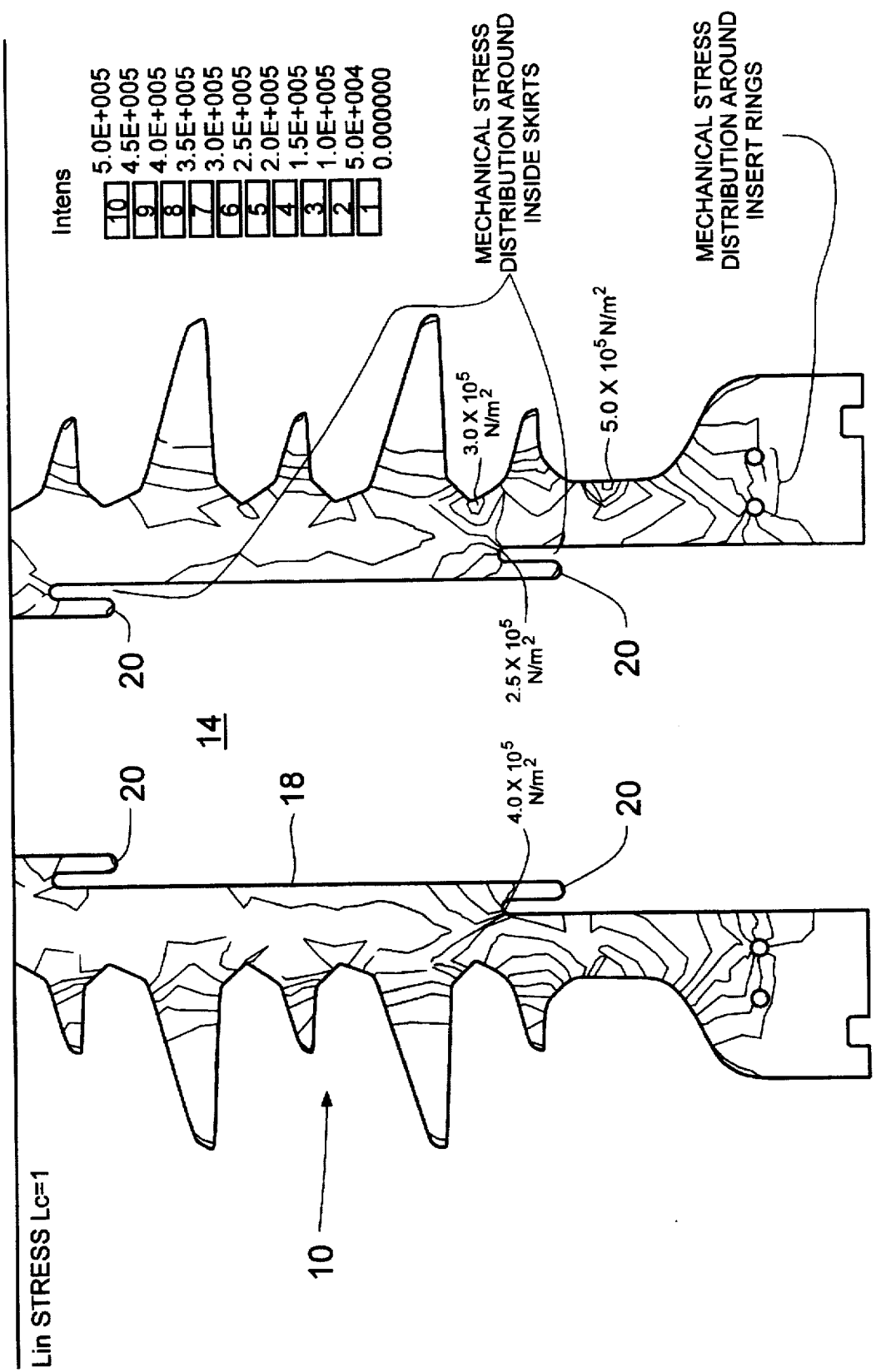
FIG. 2 is an illustration of a mechanical stress analysis of a portion of the encapsulation of FIG. 1.

FIG. 2 illustrates a mechanical stress analysis of a portion of the encapsulation 10 of FIG. 1. As illustrated in FIG. 2, the peak mechanical stress is about $5 \times 10^5 N/m^2$ when a cantilevered load of 25 pounds is applied to an end of an arm extending from the top of the encapsulation. The stress is well below the strength of the epoxy. Accordingly, the convolutions 20 do not compromise the strength of the encapsulation 10.

Figure 3:
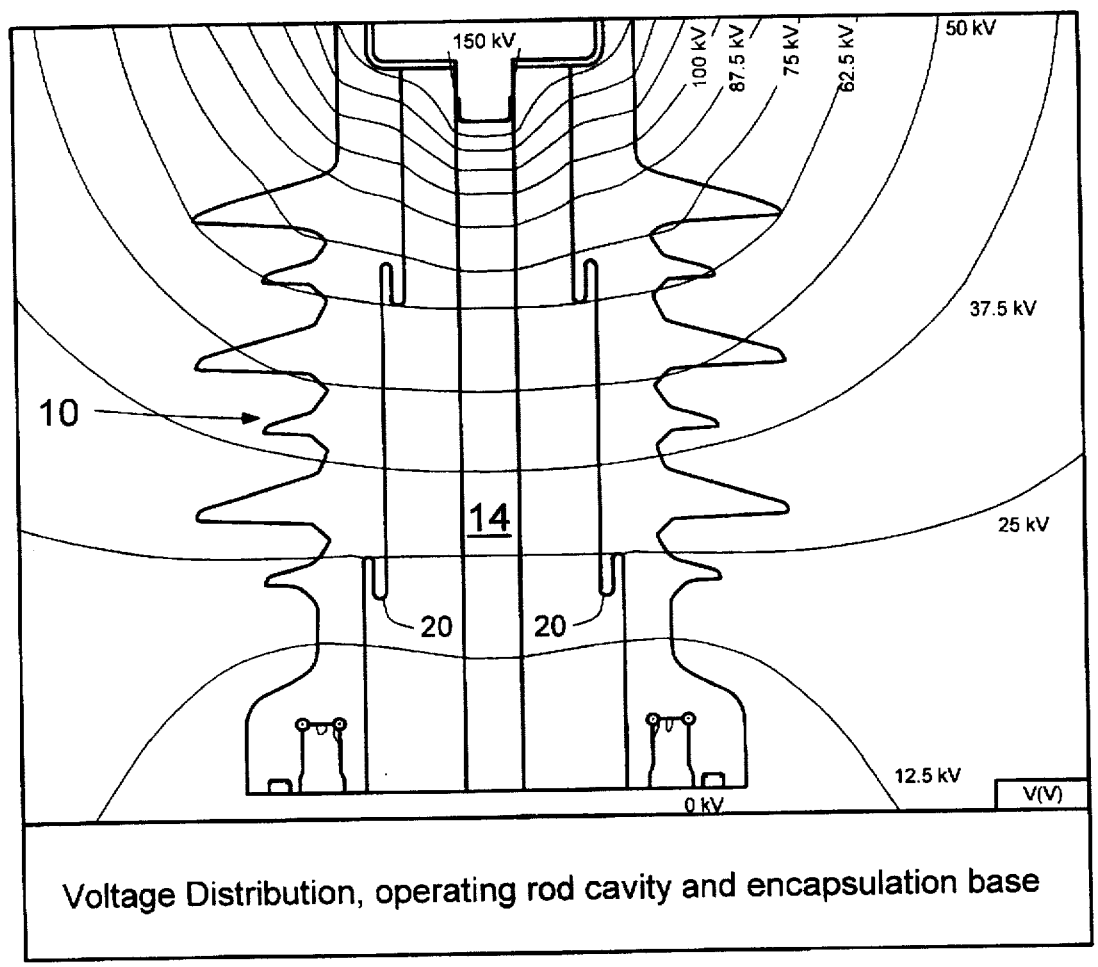
FIG. 3 illustrates a voltage distribution inside the encapsulation of FIG. 1.
Figure 4:
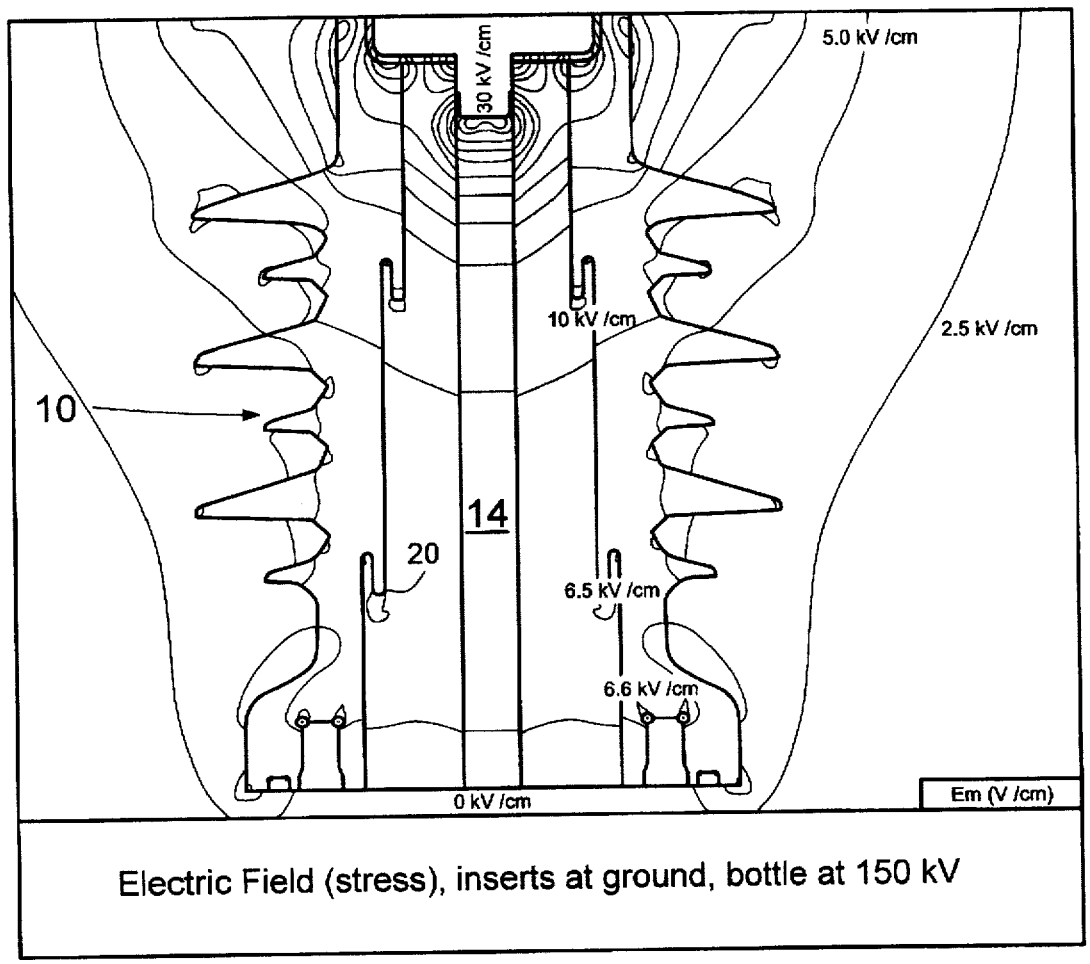
FIG. 4 illustrates an electric field distribution inside the encapsulation of FIG. 1.

FIGS. 3 and 4 illustrate the electrical stress of the encapsulation 10. In particular, FIG. 3 illustrates the voltage distribution about the chamber 14. FIG. 4 illustrates the electric field (stress), i.e., the gradient voltage variation, of the chamber 14.

To support the encapsulation 10 and interrupter 12, threaded nuts 26 are inserted into the base of the encapsulation 10 during the casting process. Preferably, the nuts 26 are equally spaced in a circular pattern. Bolts (not shown) are then used to fasten the encapsulation 10 to the frame 16.

Figure 5:
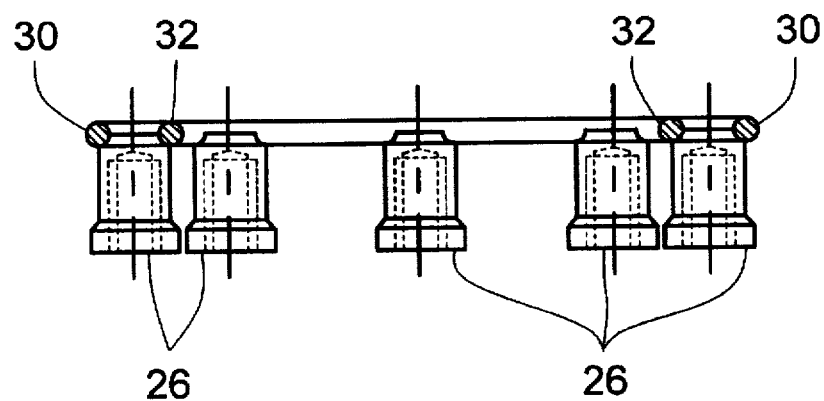
FIG. 5 is a side view of an insert assembly that is used in the encapsulation of FIG. 1.
Figure 6:
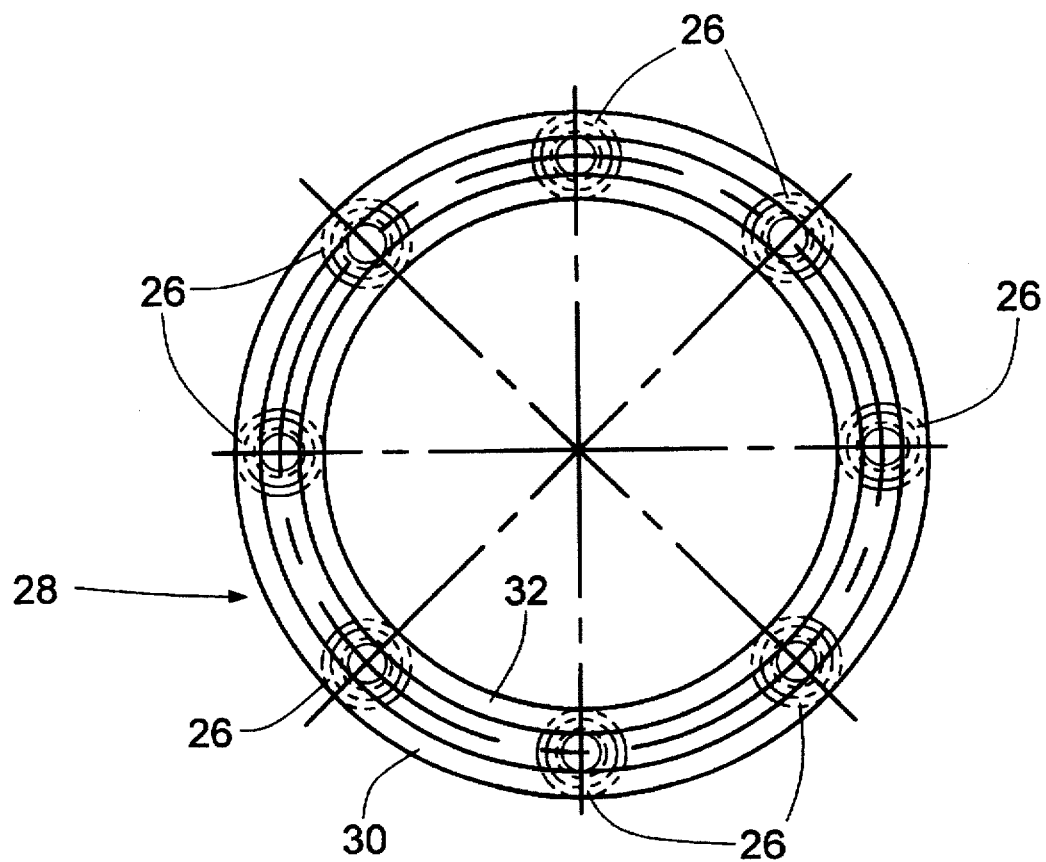
FIG. 6 is a plan view of the insert assembly of FIG. 5.

To facilitate assembly and to increase the strength of the finished product, the nuts 26 are prearranged on an insert assembly 28. The assembly 28 preferably includes a pair of rings 30, 32 concentrically arranged. See FIGS. 5 and 6. The threaded nuts 26 may be welded, or otherwise secured, to the rings 30, 32. In a preferred embodiment, eight nuts 26 are equally spaced at 45° between the concentric rings 30, 32. The approximate diameter of the insert assembly 28 is 4.6 inches.

The insert assembly 28 may be inserted into a mold prior to casting the encapsulation 10 so, as can be seen in FIG. 2, the stress values detected near the rings 30, 32 are relatively low.

Figure 7:
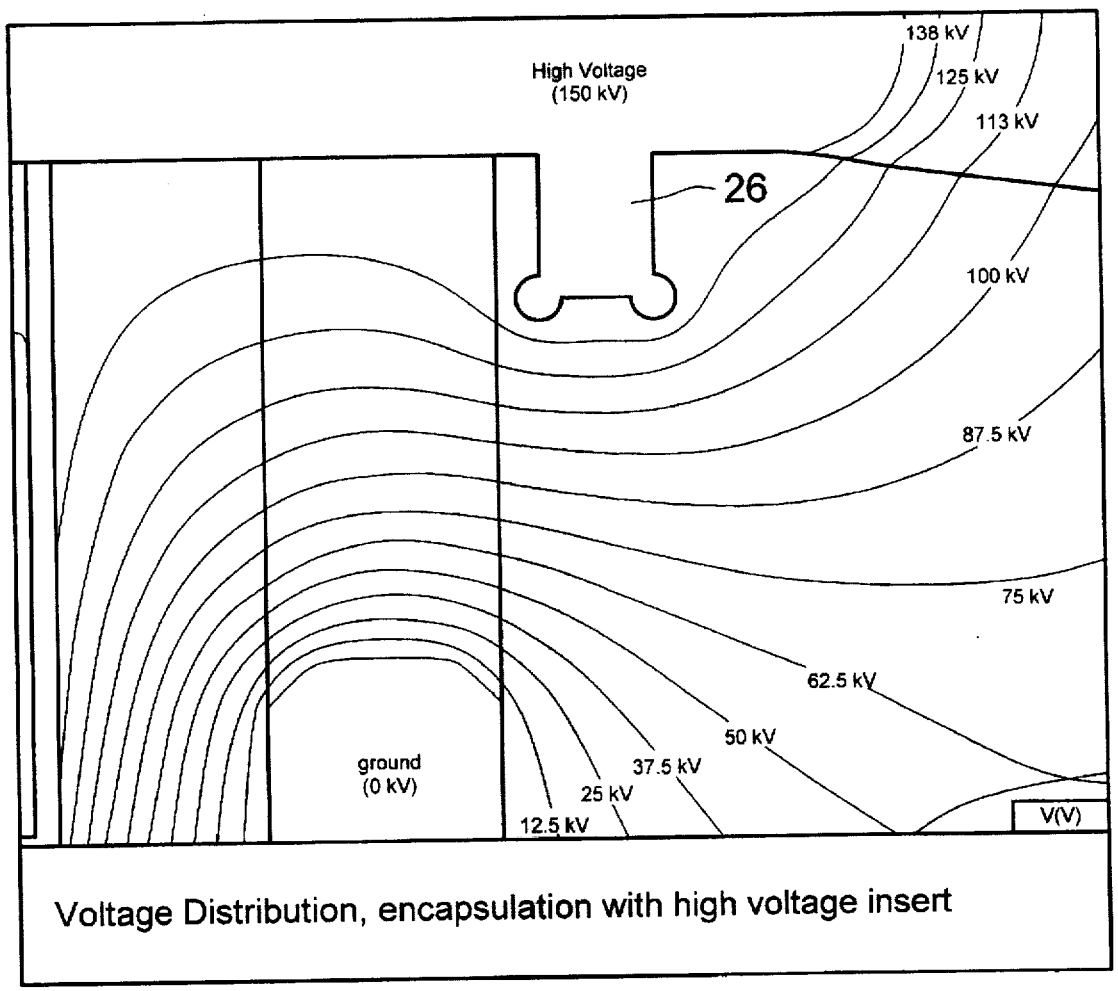
FIG. 7 illustrates a voltage distribution round the insert assembly of FIG. 5.
Figure 8:
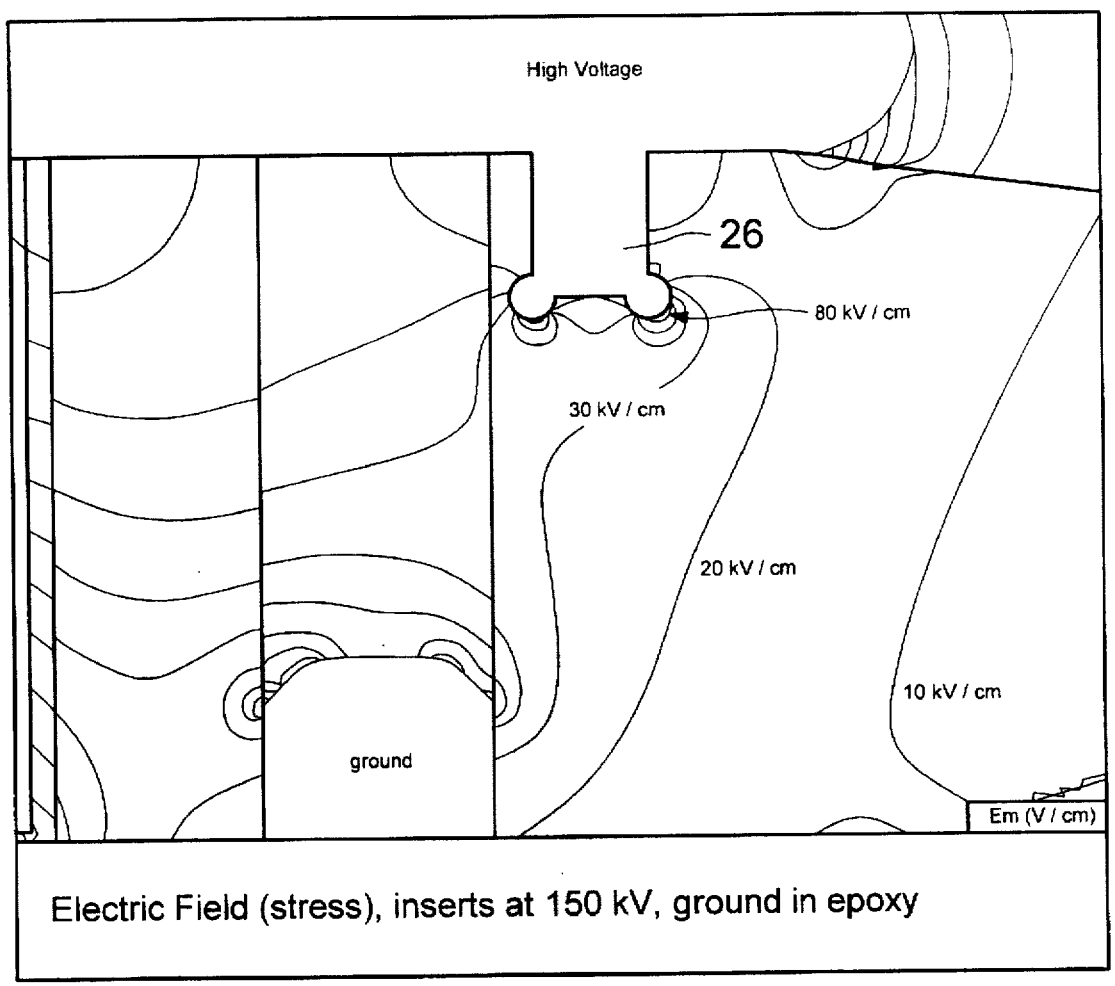
FIG. 8 illustrates an electric field around the insert assembly of FIG. 5.

FIG. 7 illustrates a voltage potential where an encapsulation 10, with the insert assembly 28, is bolted to a structure which also contains a high voltage potential. FIG. 8 illustrates the electric field (stress) around the rings 30, 32. As can be seen, the rings 30, 32 act to smooth out the electric field below its breakdown value.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An encapsulation for an interrupter, comprising:

a main body that includes an internal cavity;

said internal cavity including a space at a first end thereof for the interrupter;

a second end of said main body including a surface for mounting said encapsulation;

an insert assembly embedded within said second end for facilitating mounting the encapsulation;

said insert assembly including a rigid connector and a plurality of fasteners fixed to said rigid connector.

2. The encapsulation of claim 1, wherein the rigid connector includes a metal ring.

3. The encapsulation of claim 1, wherein the rigid connector includes two concentric metal rings.

4. The encapsulation of claim 2, wherein the fasteners are threaded nuts and are welded to the metal ring.

5. The encapsulation of claim 3, wherein the fasteners are threaded nuts and are welded to the metal rings.

6. The encapsulation of claim 1, wherein the fasteners are spaced equally around the metal ring.

7. A method of making an encapsulation for an interrupter, comprising the steps of:

providing an insert assembly comprising a plurality of fasteners secured to a rigid connector; and molding a main body of the encapsulation around the insert assembly.

8. The method of claim 7, wherein said insert assembly includes a metal ring and the fasteners are threaded nuts that are welded to the metal ring.

9. The method of claim 7, wherein said insert assembly includes two concentric metal rings and the fasteners are threaded nuts that are welded to the metal rings.

10. The method of claim 7, further comprising the step of casting a convolution in an inner wall of said encapsulation.

11. The method of claim 8, further comprising the step of casting a convolution in an inner wall of said encapsulation.

12. The method of claim 9, further comprising the step of casting a convolution in an inner wall of said encapsulation.

13. An encapsulation for an interrupter, comprising:

a main body that includes a wall defining an internal cavity;

the internal cavity including a space at a first end of the main body for the interrupter;

the wall includes a surface at a second end of the main body for mounting the encapsulation to a frame;

an insert assembly embedded within the wall at the second end for facilitating mounting the encapsulation to the frame;

the insert assembly includes a rigid connector and a plurality of fasteners fixed to the rigid connector, the insert assembly being embedded within the wall such that each of the plurality of fasteners is spaced from the internal cavity and is flush with the surface.

14. The encapsulation of claim 1, wherein the insert assembly is molded within the second end.

15. The method of claim 7, wherein the encapsulation is an encapsulation for a high voltage interrupter.

* * * * *